United States Patent [19]

Deamicis

[11] Patent Number: 5,011,168
[45] Date of Patent: Apr. 30, 1991

[54] PORTABLE GARBAGE CONTAINER

[76] Inventor: Ferdinando Deamicis, 9560 John St Rd., Thunder Bay, Ontario P7B 4E2, Canada

[21] Appl. No.: 408,549

[22] Filed: Oct. 20, 1989

[51] Int. Cl.$^5$ .............................................. B62B 1/00
[52] U.S. Cl. ................................. 280/47.26; 49/260; 220/252
[58] Field of Search ............... 280/47.26, 47.18, 47.33; 220/331, 252, 229, 236; 49/254, 257, 260

[56] References Cited

U.S. PATENT DOCUMENTS

| 2,550,998 | 5/1951 | Hilliker | 220/252 |
| 2,721,635 | 10/1955 | Fullerton | 49/260 |
| 3,384,385 | 5/1968 | Cohen et al. | 220/331 |
| 3,751,854 | 8/1973 | Huwyler et al. | 49/260 |
| 4,600,113 | 7/1986 | DeMars | 280/47.26 |
| 4,635,956 | 1/1987 | Morrissette | 280/47.26 |
| 4,715,315 | 12/1987 | Burford | 49/254 |
| 4,789,171 | 12/1988 | Porter | 280/47.26 |

Primary Examiner—Richard A. Bertsch
Attorney, Agent, or Firm—Palmatier & Sjoquist

[57] ABSTRACT

The present portable garbage container includes a housing, and a cover which is slidable and tiltable relative the housing. As the cover is slidable from a seat and into a transverse slot formed in the housing, the cover tilts so as to shift its weight to a sidewall of the housing, which facilitates the sliding of the cover and allows an efficient opening of the container. The cover is also efficiently closed by tilting the cover inwardly. The cover subsequently slides down the slot and into the seat.

10 Claims, 2 Drawing Sheets

5,011,168

PORTABLE GARBAGE CONTAINER

The present invention relates to garbage containers and more particularly to portable garbage containers with readily accessible interiors.

BACKGROUND OF THE INVENTION

The confinement of garbage and the placement of garbage cans relative a residence are often regulated by municipalities. For instance, city codes may require garbage covers for garbage cans or even the isolation of the garbage cans themselves inside garages or sheds.

A garage or shed like trash shelter of a residence is generally located at a distance from the street running in front of the residence where trash is picked up by sanitation workers. A wagon is a typical vehicle used to haul garbage cans or trash bags from the garage or trash shed to the trash pickup site adjacent the street.

SUMMARY OF THE INVENTION

A feature of the present invention is the provision in a garbage container, of a cover for the container wherein the cover includes rollers which ride in transverse slots formed in end walls of the container so that the cover is slidable via the slots to a sidewall of the container for allowing access to the inside of the container.

Another feature of the present invention is the provision in such a garbage container, of obliquely disposed slot portions which allow the cover to be slidable from the sidewall and down portions of the slots for a sealing of the container.

Another feature of the present invention is the provision in a garbage container, of a tiltable cover for the container that rides in transverse slots formed in end walls of the container wherein the cover is slidable to a sidewall of the container and tiltable thereon for allowing access to the inside of the container and wherein portions of the slots are obliquely disposed so that the cover is slidable from the sidewall and down portions of the slots to be tiltable to an upright orientation to close off the container.

An advantage of the present invention is that its interior is readily accessible for the deposit and removal of garbage.

Another advantage of the present invention is that it is easily sealable for the sanitary confinement of garbage.

Another advantage of the present invention is that it is readily portable despite its relatively large size, which allows the containment of at least three conventional garbage cans and assorted plastic bags and sticks or other odds and ends.

Another advantage of the present invention is that it may include a heavy plastic or metal cover which is easily tilted and slid to an open position but which is sufficiently massive to deter access by animals.

Another advantage of the present invention is that it is simple and inexpensive to manufacture and operate.

Anther advantage of the present invention is that it is aesthetically pleasing.

DETAIL DESCRIPTION OF THE INVENTION

Figure 1:
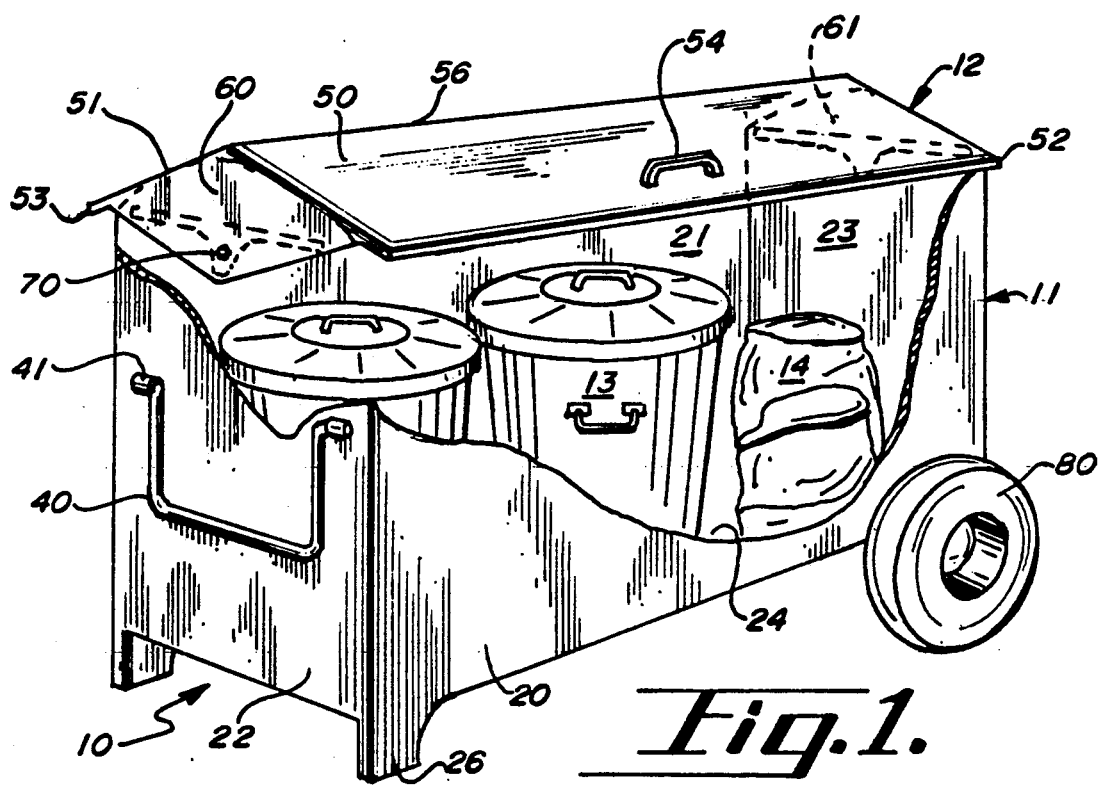
FIG. 1 is an isometric, partially broken away view
Figure 2:
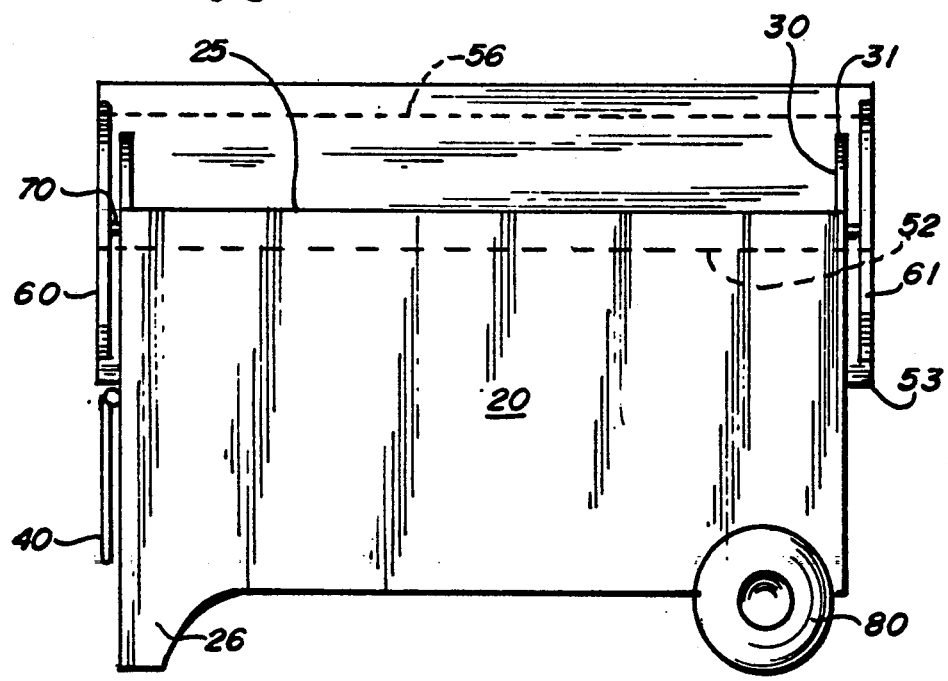
FIG. 2 is a side elevation, partially phantom view of the garbage container of FIG. 1.

As shown in FIG. 1, a portable garbage container is indicated in general by the reference numeral 10. The garbage container includes as its principal components a housing 11 and a cover 12. The garbage container 10 is typically of sufficient size to hold three conventional garbage cans 13, or two garbage cans 13 and an odd assortment of bags 14.

The housing 11 is generally box like and includes a pair of generally rectangular sidewalls 20, 21, and a pair or pentagonal end walls 22, 23 and a rectangular floor 24. Each of the sidewalls 20, 21 includes an upper linear edge 25. Each of the sidewalls 20, 21 further includes a front integral leg 26 for supporting the garbage container 10 relative the ground.

Each of the end walls 22, 23 includes upper generally angled edges 30 and a rounded apex 31. Each of the end walls 22, 23 further includes a transverse slot 32. The slot 32 is formed in part by an upper edge 33 which is substantially linear and horizontally disposed. The slot 32 is further formed by a lower edge 34 which includes outer linear edge portions 35 which are horizontally disposed and which lead into oblique curved edge portions 36. Oblique edge portions 36 run inwardly and downwardly toward each other to form a seat 37 for the cover 12 when the edges 33, 34 are joined by rounded edge portions or seats 38, each of which forms a seat for the cover 12 when the cover is in an open position.

A swingable handle 40 is mounted in bearings 41 which are affixed to the front end wall 22. The handle 40 is swingable upwardly and through a 90° angle with front end wall 22. The handle 40 is mounted sufficiently low on the end wall 22 so that when the handle 40 is swung upwardly and upward lifting pressure is applied thereto, the legs 26 are lifted off of the ground.

The cover 12 includes a pair of panels 50, 51 which are set at an angle to each other. The length of each of the panels 50, 51 is greater than the distance from front end wall 22 to the rear end wall 23 so that eave portions of the panels 50, 51 overhang the end walls 22, 23. Each of the panels 50, 51 further includes respective eaves 52, 53 which overhang respective sidewalls 20, 21, and U-shaped handles 54, 55 affixed adjacent the eaves 52, 53. The panels 50, 51 form an apex 56.

The cover 12 further includes front and rear diamond shaped end supports 60, 61. Support 60, 61 extend exteriorly of the end walls 22, 23 and downwardly so as to cover slots 32 and protect the interior of the container 10 from wind, rain or snow. The undersides of the cover panels 50, 51 bear against end wall and sidewall upper edges 25, 30 so as to seal the interior of the container 10 from wind and entry of moisture such as rain, sleet or snow.

A roller pin 70 is rotatably mounted in each of the supports 60, 61 and extends through slots 32. The cover 12 slides transversely in slot 32 and is tiltable via the roller pins 70 relative the housing 11. The pin 70 includes a washer 71 and a nut 72 which are disposed on the inside of end walls 22, 23.

A pair of rear wheels 80, 81 are mounted to a rear portion of the floor 24. The diameter of each of the wheels 80, 81 is approximately twice the height of the legs 26 so that the container 10 is substantially level relative the ground. The wheels 80, 81 have a width of approximately one-third the diameter of each of the wheels 80, 81 so as to be fairly wide to roll efficiently across soft lawns.

Figure 3:
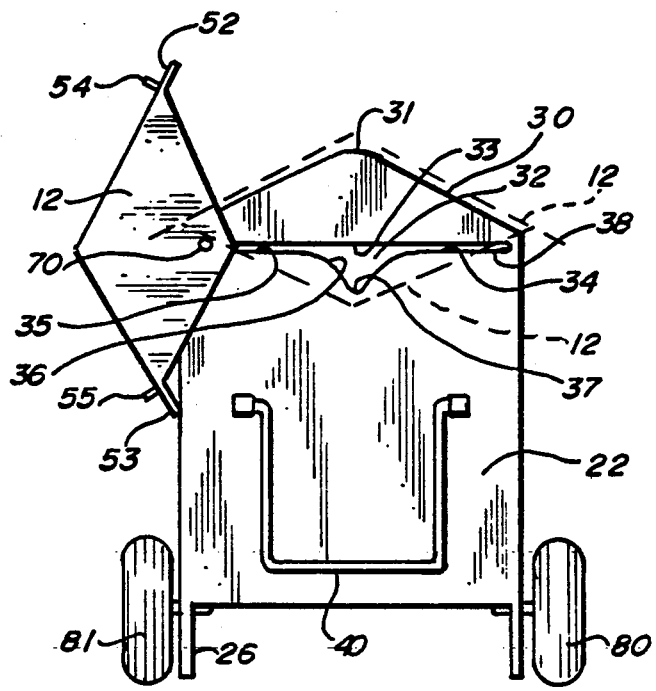
FIG. 3 is a front elevation, partially phantom view of the garbage container of FIG. 1.
Figure 4:
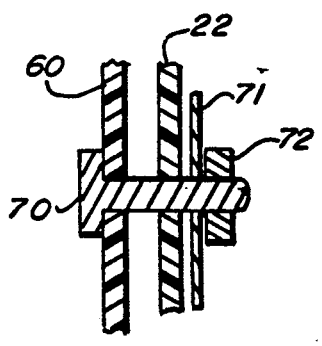
FIG. 4 is a detail, section view of a roller for the cover of the garbage container of FIG. 1.

In operation, to open the garbage container 10, the cover 12 is slid transversely to one of the sidewalls 20, 21. As the cover 12 slides in slots 32, the cover 12 is tilted to allow access to the interior of the container 10. In particular, the pins 70 of each of the supports 60, 61 slide or roll in slot 32 from seats 37, onto the curved edge portions 36 and the linear edge portions 35 to bear against and in seats 38. Before the pins 70 roll into their respective end seats 38, the cover 12 is tilted to shift much of its weight toward the side of the container 10 to which it is being slid. With the shift in weight of the tilting cover 12, the cover 12 readily slides into the seat 38. In the open position as shown on FIG. 3, the handle 53 bears against the sidewall 21. The cover 12 is also slidable and tiltable to the other side of the container 10 so that handle 52 bears against sidewall 20.

The close the cover 12 from the open position, the cover 12 is slide via slot 32 and tilted simultaneously to move the cover 12 inwardly and shift the weight of the cover toward the center of the container. As the pins 70 move in slots 32, the pins 70 roll out of seats 38, onto linear edge portions 35, down curved edge portions 36 and into seats 37. As the pins 70 are seated in seats 37, the cover 12 comes to rest on the upper edges 25 and 30 of the housing 11.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A portable garbage container comprising:
a housing with an end wall and a sidewall,
a wheel affixed to the housing to render the housing portable,
a cover mountable on the housing and having a roller about which the cover is tiltable, and
a transverse slot formed in the end wall of the housing and in which the roller is slidable, the slot including first and second seats for the roller, the roller receivable in the first seat when the cover is in a closed position and in the second seat when the cover is in an open position, the roller slidable in the slot between the seats and the cover being tiltable simultaneously to allow the cover to be efficiently opened and closed.

2. The portable garbage container according to claim 1, wherein the first seat is disposed centrally in the end wall.

3. The portable garbage container according to claim 2, wherein the first seat includes an oblique edge portion so that the roller is slidable down into the first seat to efficiently return the cover to the closed position.

4. The portable garbage container according to claim 1, wherein the first seat includes an oblique edge portion so that the roller is slidable down into the first seat to efficiently return the cover to the closed position.

5. The portable garbage container according to claim 1, wherein the second seat is disposed in a side portion of the end wall.

6. The portable garbage container according to claim 5, wherein the upper and lower edge portions are disposed substantially horizontally.

7. The portable garbage container according to claim 5, wherein the second seat is formed in part by upper and lower linear edge portions of the slot.

8. The portable garbage container according to claim 7, wherein the upper and lower edge portions are disposed substantially horizontally.

9. The portable garbage container according to claim 1, wherein the second seat is formed in part by upper and lower linear edge portions of the slot.

10. A portable garbage container comprising:
a housing with sidewalls, front and rear end walls, and a floor, each of the end walls having an apex formed by upper angled edges, each of the sidewalls having upper linear edges,
a pair of rear wheels affixed to the floor of the housing,
a pair of front legs affixed to the floor opposite the wheels,
a swingable handle affixed to the front end wall for lifting and pulling the container,
an angled cover mountable on the upper angled edges of the end walls and upper linear edges of the sidewalls, the cover having eaves overhanging the end walls and sidewalls of the housing and diamond shaped supports affixed on each end of the cover and exteriorly of the end walls, each of the supports including a roller about which the cover is tiltable, each of the eaves including a pair of handles for aiding in tilting and sliding the cover, and
a transverse slot formed in each of the end walls of the housing, each of the slots including a first, centrally disposed seat for receiving the roller when the cover is in a closed position, a pair of second seats disposed in side portions of each of the end walls for receiving the rollers when the cover is in an open position, and a pair of curved, downwardly extending edge portions leading into the first seat for facilitating the sliding of the cover into the closed position whereby the rollers are slidable in the slots between the seats and the cover is tiltable simultaneously to allow the cover to be efficiently opened and closed.

* * * * *